United States Patent
Dropps et al.

(10) Patent No.: US 9,426,063 B1
(45) Date of Patent: Aug. 23, 2016

(54) SYSTEMS AND METHODS FOR ROUTING BY NETWORK DEVICES

(71) Applicant: QLOGIC, Corporation, Aliso Viejo, CA (US)

(72) Inventors: Frank R. Dropps, Maple Grove, MN (US); Craig M. Verba, Maple Grove, MN (US); William J. Andersen, Mound, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 720 days.

(21) Appl. No.: 13/678,378

(22) Filed: Nov. 15, 2012

(51) Int. Cl.
H04L 12/28 (2006.01)
H04L 12/781 (2013.01)

(52) U.S. Cl.
CPC .................................. H04L 45/52 (2013.01)

(58) Field of Classification Search
CPC ..... H04L 45/52; H04L 12/42; H04L 12/5696; H04L 61/6045; H04L 2463/144; H04L 41/00; H04L 1/201
USPC ......................................................... 370/401
See application file for complete search history.

(56) References Cited

U.S. PATENT DOCUMENTS

| | | | |
|---|---|---|---|
| 2007/0022479 A1* | 1/2007 | Sikdar et al. | 726/22 |
| 2010/0118880 A1* | 5/2010 | Kunz et al. | 370/401 |
| 2012/0084423 A1* | 4/2012 | McGleenon | 709/223 |
| 2013/0272305 A1* | 10/2013 | Lefebvre et al. | 370/392 |

* cited by examiner

Primary Examiner — Andrew Chriss
Assistant Examiner — Ellen Kirillova
(74) Attorney, Agent, or Firm — Klein, O'Neill & Singh, LLP

(57) ABSTRACT

A network device and associated methods are provided. The network device includes a routing module having a ternary content addressable memory (TCAM) module maintained for storing a plurality of entries for routing frames that are received for a plurality of sub-ports complying with a plurality of protocols; a steering action memory that stores a plurality of steering action codes associated with the plurality of TCAM entries for tossing frames, rejecting frames and providing them to a processor for the network device, indicating that a destination is valid, and indicating to use another routing mechanism; and a steering mechanism that is used when a received frame information does not match with the TCAM entries and the received frame is of a certain protocol type.

20 Claims, 8 Drawing Sheets

| Ethernet Header 502 | FCOE Header 504 | SOF 506 | FC Header 508 | Pay Load 510 | FC CRC 512 | EOF 514 | Ethernet FCS 516 |

500

| Word/Bits | FC Header 508 ||||
|---|---|---|---|---|
| | 31       24 | 23       16 | 15       08 | 07       00 |
| | R_CTL 508C | D_ID 508A |||
| | CS_CTL/Priority | S_ID 508B |||
| | Type | F_CTL |||
| | SEQ_ID | DF_CTL | SEQ_CNT ||
| | OX_ID || RX_ID ||
| | Parameter ||||

SYSTEMS AND METHODS FOR ROUTING BY NETWORK DEVICES

BACKGROUND

1. Technical Field

The embodiments disclosed herein are related to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication.

The network switch is typically a multi-port device where each port manages a point-to-point connection between itself and an attached system. Each port can be attached to a server, peripheral, input/output subsystem, bridge, hub, router, or another switch, where each of the aforementioned network devices also has one or more ports. The term network switch as used herein includes a Multi-Level switch that uses plural switching elements within a single switch chassis to route data packets. Different network and storage protocols may be used to handle network information and storage information.

Routing methods for different protocols are typically different. For example, Ethernet uses content addressable memory driven routing while Fibre Channel uses table based routing. Continuous efforts are being made to enhance the use of networking and storage protocols and efficient routing techniques for different protocols.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a network device is provided. The network device includes a plurality of base-ports, each base-port having a plurality of sub-ports configured to operate independently as a port for sending and receiving information using one of a plurality of network links at a plurality of rates complying with a plurality of protocols. The network device also includes a routing module having a ternary content addressable memory (TCAM) module maintained for storing a plurality of entries for routing frames that are received for the plurality of sub-ports complying with the plurality of protocols; a steering action memory that stores a plurality of steering action codes associated with the plurality of TCAM entries for tossing frames, rejecting frames and providing them to a processor for the network device, indicating that a destination is valid, and indicating to use another routing mechanism; and a steering mechanism that is used when a received frame information does not match with the TCAM entries and the received frame is of a certain protocol type.

In yet another embodiment, a network device having a plurality of base-ports, each base-port having a plurality of sub-ports configured to operate independently as a port for sending and receiving information using one of a plurality of network links at a plurality of rates complying with a plurality of protocols is provided. The network device also includes a scheduler that is configured to receive requests on behalf of the plurality of sub-ports for moving frames from a receive segment and for transmitting frames from a transmit segment of one of the base-ports.

The network device further includes a routing module having a ternary content addressable memory (TCAM) module maintained for storing a plurality of entries for routing frames that are received for the plurality of sub-ports complying with the plurality of protocols; a steering action memory that stores a plurality of steering action codes associated with the plurality of TCAM entries for tossing frames, rejecting frames and providing them to a processor for the network device, indicating that a destination is valid, and indicating to use another routing mechanism; and a steering mechanism that is used when a received frame information does not match with the TCAM entries and the received frame is of a certain protocol type. The requests from the plurality of sub-ports are generated by a request module after a destination for received frames is determined by the routing module that maintains the TCAM module.

In yet another embodiment, a machine-implemented method for routing a frame received by a network device is provided. The method includes maintaining a plurality of entries at a ternary content addressable memory (TCAM) of a routing module for routing the frame for a base-port of the network device having a plurality of sub-ports configured to operate independently as a port for sending and receiving information using one of a plurality of network links at a plurality of rates complying with a plurality of protocols; searching the TCAM module to determine if information regarding the frame matches any of the TCAM module entries; determining a steering code from a steering action memory at the routing module associated with a matching TCAM module entry; providing a destination information to a request module for routing the frame; and using a steering mechanism of the routing module when there is no matching entry at the TCAM module.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods for packet grouping in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
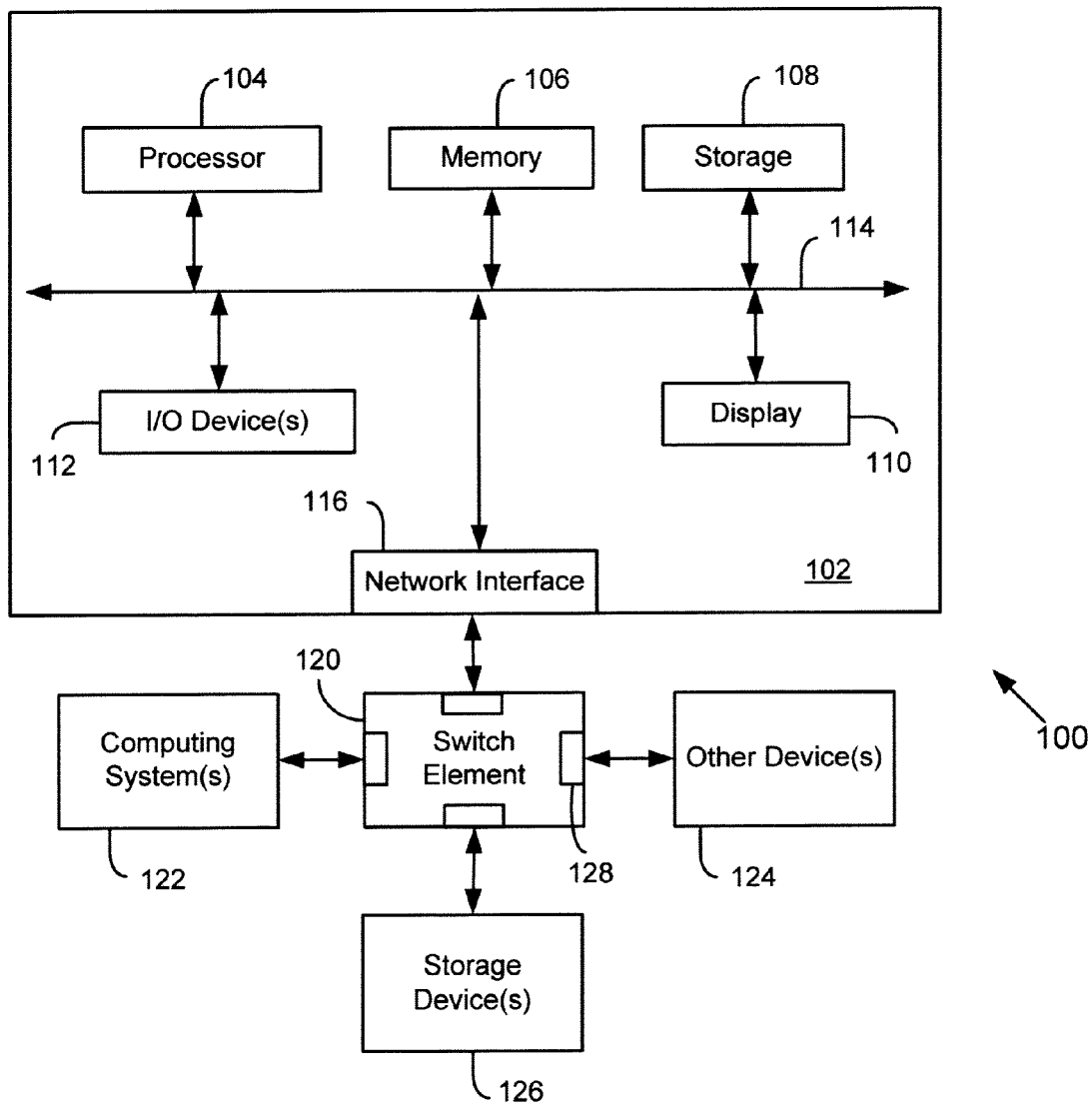

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor, processors or processing module) 104, a host memory (or main/system memory) 106, a storage device 108, a display 110, input/output ("I/O")

device(s) 112, and other components (or devices). The host memory 106 is coupled to the processor 104 via a system bus or a local memory bus 114.

The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports). Fabric ports (F_Ports), and expansion ports (E_Ports). Node ports may be located in a node device, e.g. the network interface 116 of the host system 102 and an interface (not shown) for the storage devices 126. Fabric ports are typically located in Fabric devices, such as the switch element 120. Details regarding the switch 120 are provided below.

Figure 2A:
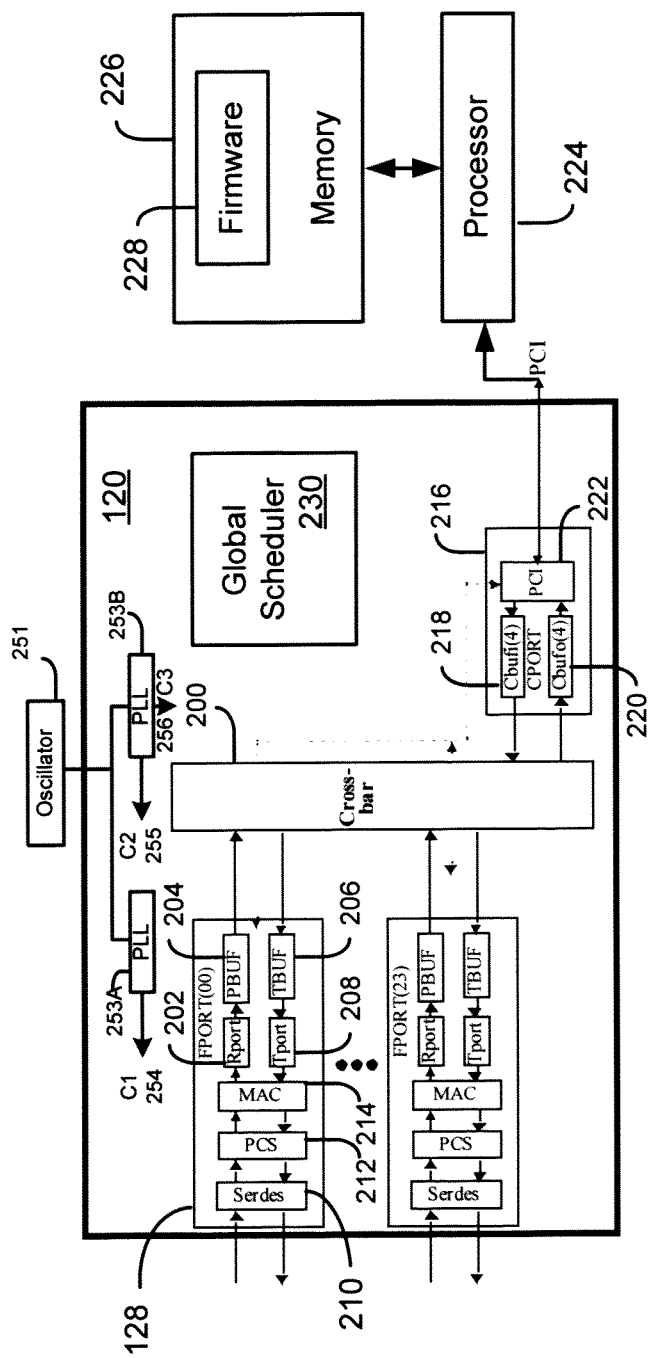
FIG. 2A is a functional block diagram of a switch element according to the present embodiments.

FIG. 2A is a high-level block diagram of switch element 120, also referred to as the switch 120. Switch element 120 may be implemented as an application specific integrated circuit (ASIC) having a plurality of ports 128. An external oscillator 251 may be used to power a plurality of phase locked loop (PLL) circuits 253A-253B to generate a plurality of clocks, C1 254, C2 255 and C3 256. As an example, C1 254 may be 425 MHz when a port is configured to operate as a Fibre Channel port, C2 255 may be 312 Mhz when a port is configured to operate as an Ethernet port, and C3 256 may be a system clock of 825 MHz. The embodiments disclosed herein are not limited to any particular clock rate.

Ports 128 are generic (GL) ports and may include an N_Port, F_Port, FL_Port, E-Port, or any other port type. Ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate ports 128 and port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT also includes a shared MAC and PCS or shares PCS 212 and MAC 214 of the RPORT 202. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently, operating sub-ports, each uniquely identified for receiving and sending frames. The sub-configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
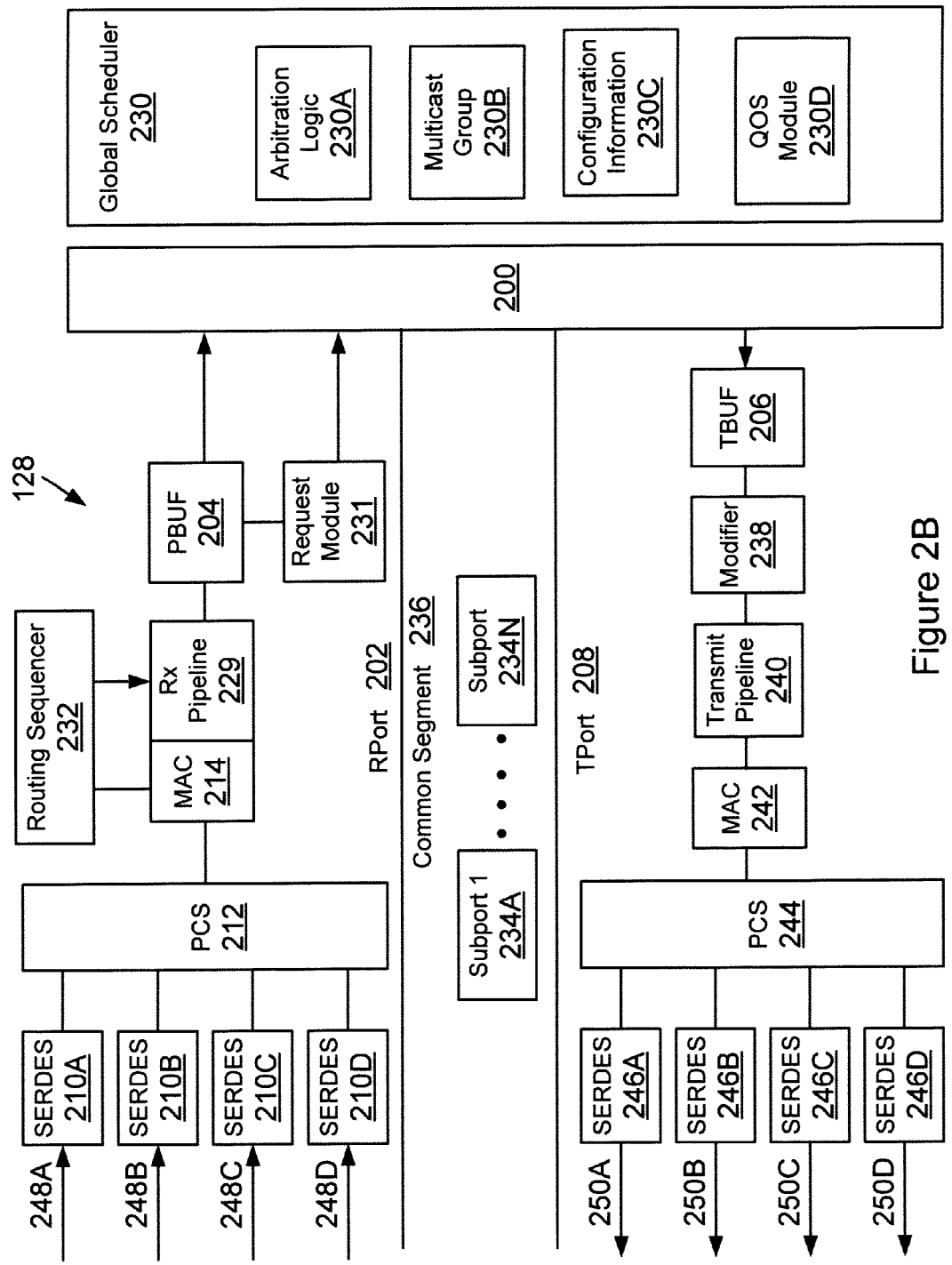
FIG. 2B is a functional block diagram of a base-port, according to one embodiment.

FIG. 2B shows an example of base-port 128 having RPORT 202. TPORT 208 and a common segment 236, according to one embodiment. RPORT 202 is used for receiving and processing frames, while TPORT 208 is used for transmitting frames. Common segment 236 is used to store information that may be commonly used among different components of base-port 128. In one embodiment, base-port may be configured to include a plurality of independently operating sub-ports. The configuration information/logic 234A-234N for each sub-port may be stored in common segment 236.

RPORT 202 may include or has access to a plurality of network links, for example, four independent physical network links (or lanes) 248A-248D, each configured to operate as a portion of an independent sub-port within base-port 128. Each network link is coupled to a SERDES 210A-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. PCS 212 and MAC 214 may be a part of the receive pipeline 229.

Incoming frames are received via one of the network links 248A-248N. The received frame is processed by the appropriate SERDES 210A-210D and then sent to the PCS 212. After PCS 212 processes the frame, the frame is provide to MAC 212 that is time shared among a plurality of sub-ports. This means that for a certain time segment (for example, clock cycles), MAC 214 may be used by one of the sub-ports. After the MAC 214 processes the frame it is sent to receive pipeline 229 that is also time shared. Information regarding the frame or a copy of the frame is also provided to a routing sequencer (or module) 232 that determine the destination of the received packets. In one embodiment, a frame whose destination is processor 224 is given the highest priority, followed by a frame that is routed by a TCAM (ternary content addressable memory) or steering registers located within a routing sequencer 232. More than one routing sequencer 232 may be used for each base-port 128.

Frames that are ready to be sent out are then staged at PBUF 204. PBUF 204 may have a plurality of queues (slots/locations) that may be referred to as receive queues. The receive queues temporarily store frames, until a request to move the frame is granted.

To move frames from the receive queues; a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 stores configuration information 230C for various ports and some of that information may be used to select requests. Scheduler 230 includes arbitration logic 230A that performs dual stage arbitration for processing requests from various base-ports, as described below in detail. Scheduler 230 also maintains a data structure at a memory labeled as multicast group 230B. The data structure stores information for identifying multicast groups that may receive multicast frames, i.e. frames that are destined to multiple destinations. Scheduler 230 uses the information for processing requests that involve multicast frames. Scheduler 230 further includes a quality of service (QOS) module 230D that monitors QOS data.

Frames for transmission via TPORT 208 move via TBUF 206 and a modifier 238. In one embodiment, modifier 238 may be used to insert, change or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. PCS 244 and MAC 242 may be a part of transmit pipeline 240.

Network links 250A-250D are similar to links 248A-248D, except links 250A-250D are used to transmit frames. Furthermore, links 248A-248D and 250A-250D may be a part of the same physical links that can receive and transmit data. In one embodiment, there are multiple requests and grants processed simultaneously.

Figure 2C:
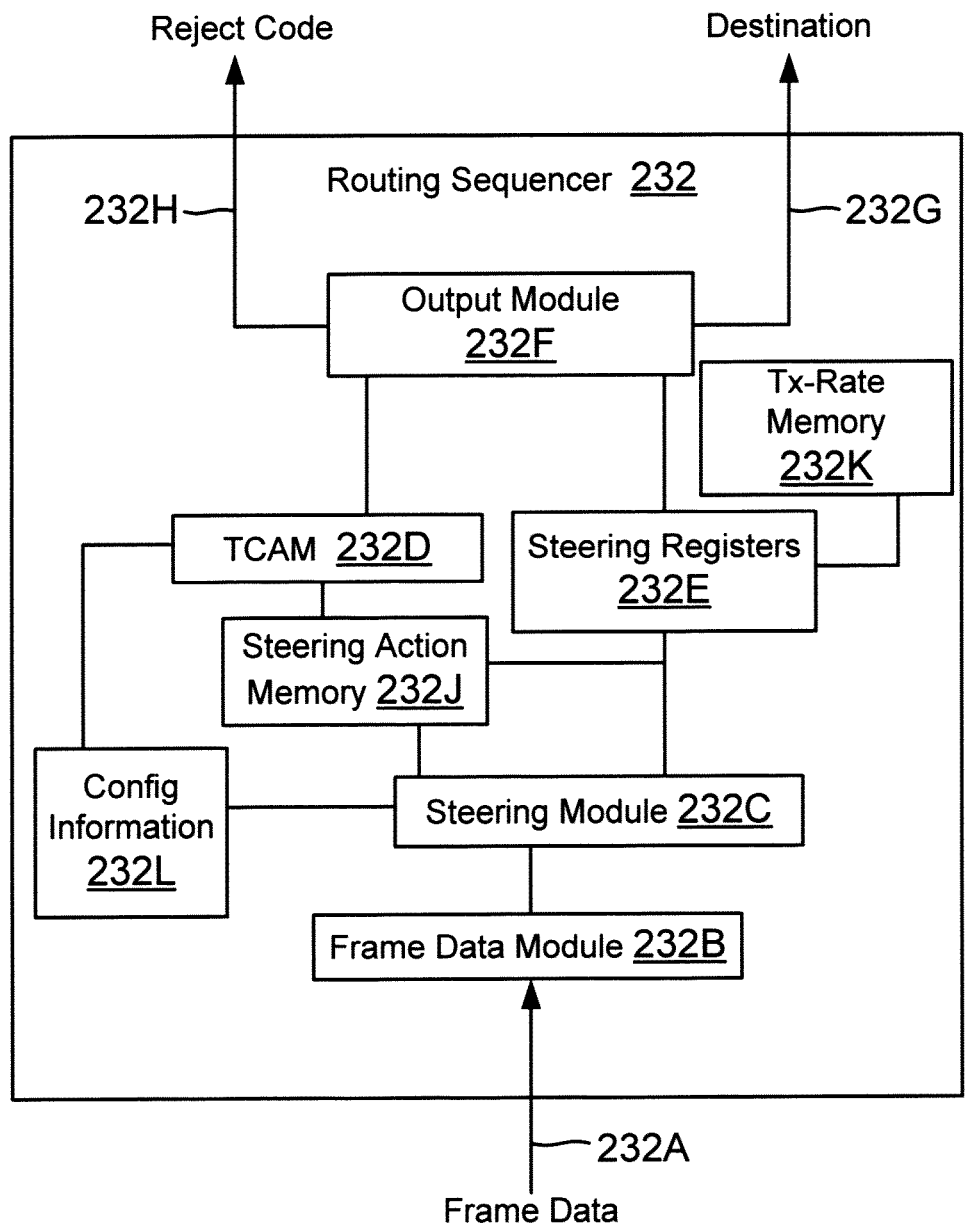
FIG. 2C is a functional block diagram of a routing module (or sequencer) 232, according to one embodiment.

FIG. 2C shows a block diagram of routing sequencer 232 used for determining the destinations of frames received by ports 128 regardless of port configuration, according to one embodiment. The routing may involve discarding a received frame, rejecting the frame and routing the frame to the processor 224 and determining a destination sub-port. The routing sequencer 232 uses the same structure regardless of how a sub-port is configured to operate, for example, as Fibre Channel, Ethernet or any other port configuration. The routing sequencer 232 may be dedicated to a sub-port or shared among the sub-ports.

The routing sequencer 232 includes a steering module 232C that may be implemented as a state machine or any other module for determining frame destinations. The steering module 232C has access to sub-port configuration information 232J that may be stored at a memory device. The configuration information 232L may be used to adjust the operation of the steering module 232C for example, if "auto-routing" is not enabled, then all received frames are routed to the processor 224.

The routing sequencer 232 includes a ternary content addressable memory (TCAM 232D) for storing routing information. Unlike standard computer memory (random access memory (RAM)) in which a user supplies a memory address and the RAM returns the data word stored at that address, TCAM 232D is designed such that when a data word is supplied, TCAM 232D searches its entire memory to see if that data word is stored anywhere in it. If the data word is found, TCAM 232D returns a list of one or more entries where the word was found.

Figure 6:
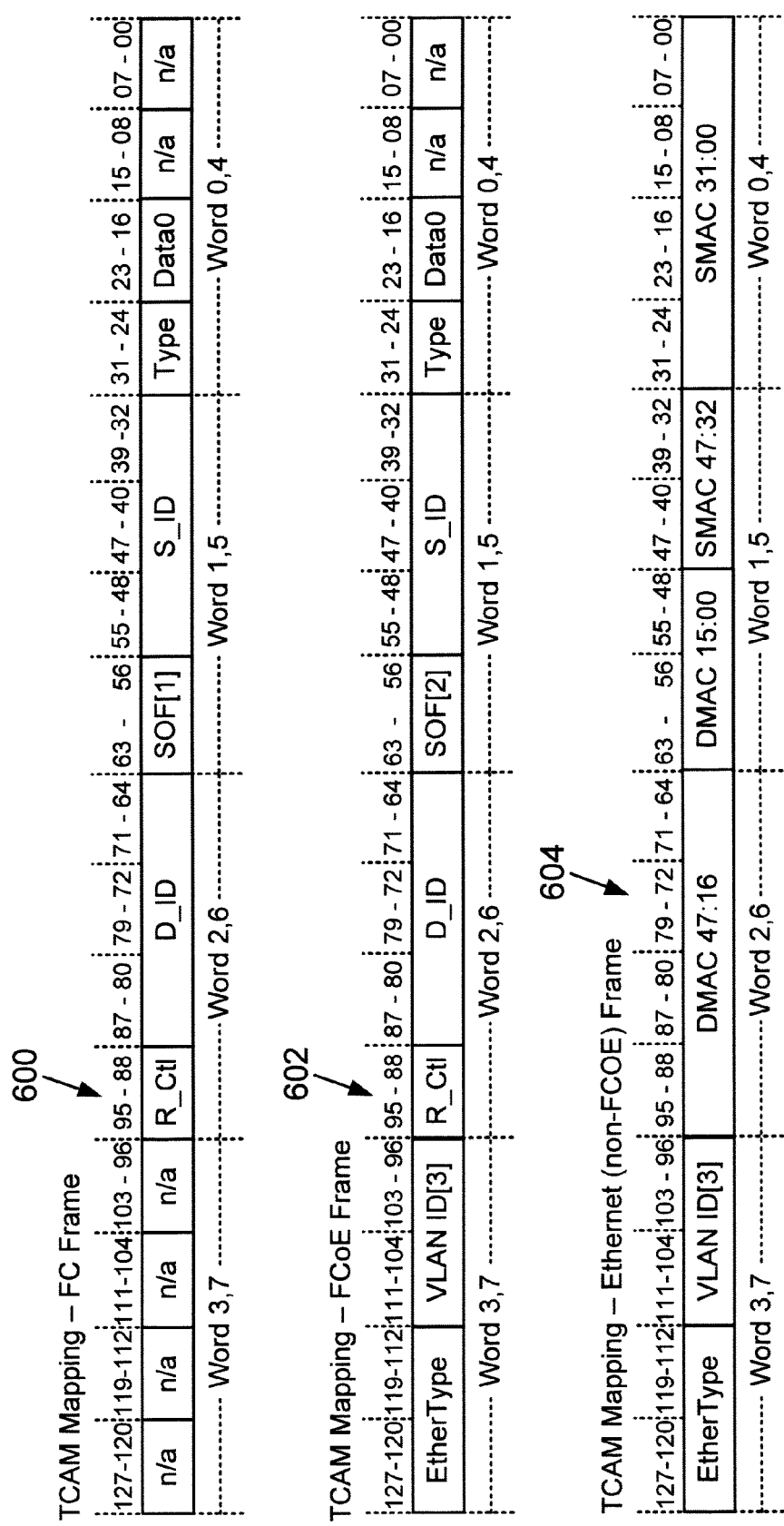
FIG. 6 illustrates an example of TCAM mapping for different frame formats, according to one embodiment.

TCAM 232D may be used to store mapping information for Fibre Channel frames (600, FIG. 6), FCoE frames (602, FIG. 6) and Ethernet frames (non-FCoE frames, 604, FIG. 6). The TCAM to Fibre Channel mapping is used to store R_CTL field (1 byte), D-ID (1 byte), S_ID (1 byte), frame type, Start of Frame (SOF) and 1 byte of the first data word. Frame to TCAM mapping information is stored when a sub-port is configured to operate only as a Fibre Channel port.

For FCoE frames, TCAM 232D stores an Ether type (0x8906) that indicates the frame type to be an FCoE frame. The remaining TCAM to FCoE mapping information is similar to a Fibre Channel frame.

For TCAM to Ethernet frame mapping includes all Ether types (2 bytes) besides the Ether type indicating an FCoE frame, a destination MAC (D_MAC) address (6 bytes), source MAC address (S_MAC) (6 bytes) and a virtual local area network identifier (VLAN ID) (2 bytes).

TCAM 232D may be used to provide a frame parameter matching function. The function may be used to determine a steering action from a steering action memory 232J. The steering action memory 232G stores a plurality of steering action codes that are used for routing frames. For example, steering action memory 232J may store a function code of 0 indicating that a frame is to be routed to processor 224, "1" to drop a frame; "2" to reject a frame and forward it to processor 224; "3" indicating that a destination port is valid; "4" indicating that the frame is for a valid multicast group; "5" indicating to use domain number (DN) offset routing; "6" to use standard domain and area routing for Fibre Channel or FCoE frames as described below and "7" that may be a reserved function code.

In one embodiment, the routing sequencer 232 also includes a steering register 232E for routing Fibre Channel and FCoE frames based on area numbers (AN) and domain numbers (DN). The term domain and area are defined by the Fibre Channel standards and described below with respect to FIGS. 5A-5C. The steering registers 232E are used to steer frames based on parsing a frame's D_ID or AL_PS (Fibre Channel arbitrated loop identifier).

The steering register 232E may be configured to have a plurality of columns. The columns are associated with rows of domain numbers (may be referred to as DN area) and area numbers (may be referred to as AN area). A column select function is used to select one of the columns and the entry is selected by addressing the row to route an incoming frame. It is noteworthy that the embodiments disclosed herein are not limited to the column steering techniques.

The DN region of the steering register 232E may have a plurality of entries, for example, 256 entries each with two word entry having four values or columns to provide steering for four paths for each 256 entry. The DN entries may be entered or read by processor 224 during frame traffic. The DN entries include destination sub-port numbers for a DN region column, a transmit virtual queue number (described below), a function code and a transmit physical queue number (described below). The DN entries are used to steer frames for a particular DN value and provide a valid destination indicator.

The AN region of the steering register 232E may also have a plurality of entries, for example, 256 entries each with two word entry having four values or columns to provide steering for four paths for each 256 entries. The AN entries may also be entered or read by processor 224 during frame traffic. The AN entries include destination sub-port numbers for an AN region column, a transmit virtual queue number, a function code and a transmit physical queue number. The AN entries are used to steer frames for a particular DN value and also provide a valid destination indicator. The entries are also used to determine how many read windows are required.

The routing sequencer 232 also maintains a transmit link (250A-250D) rate at a memory 232K. This memory is used to determine how much of frame needs to be received before it can be processed to comply with cut-through routing. In cut-through routing a portion of a frame depending on the rate at which the frame is received and transmitted has to be received before the frame can be moved.

The routing sequencer 232 receives information regarding frames that are received via links 248A-248D (FIG. 2B). The information is shown as frame data 232A that is staged at frame data module 232B. The frame data 232A may be obtained from MAC 214 after the frames have been pre-processed by PCS 212 and MAC 214.

The frame data 232A is used to select a destination based on certain frame fields, for example, an identifier of a frame source and/or a destination identifier. The destination may be selected using the TCAM 232D or the steering register 232E or a combination of the two, as described below in detail.

Using information from frame data 232A, the TCAM 232D is searched. If a match is found, then a steering action code may be obtained using steering action memory 232L. The steering action may be to toss the frame, route by using a multicast table (not shown), route by using a DN offset from the steering registers 232E and others.

The steering registers 232E are used if there is no TCAM match and the frame type is FC or FCoE. The steering register routing may be based on parsing D-ID and/or AL_PS.

When a destination is found, the destination 232G is provided by an output module 232F to request module 231 to generate a request for scheduler 230. If no destination is found, then the output module 232F generates a reject code 232H for processor 224.

Figure 3:
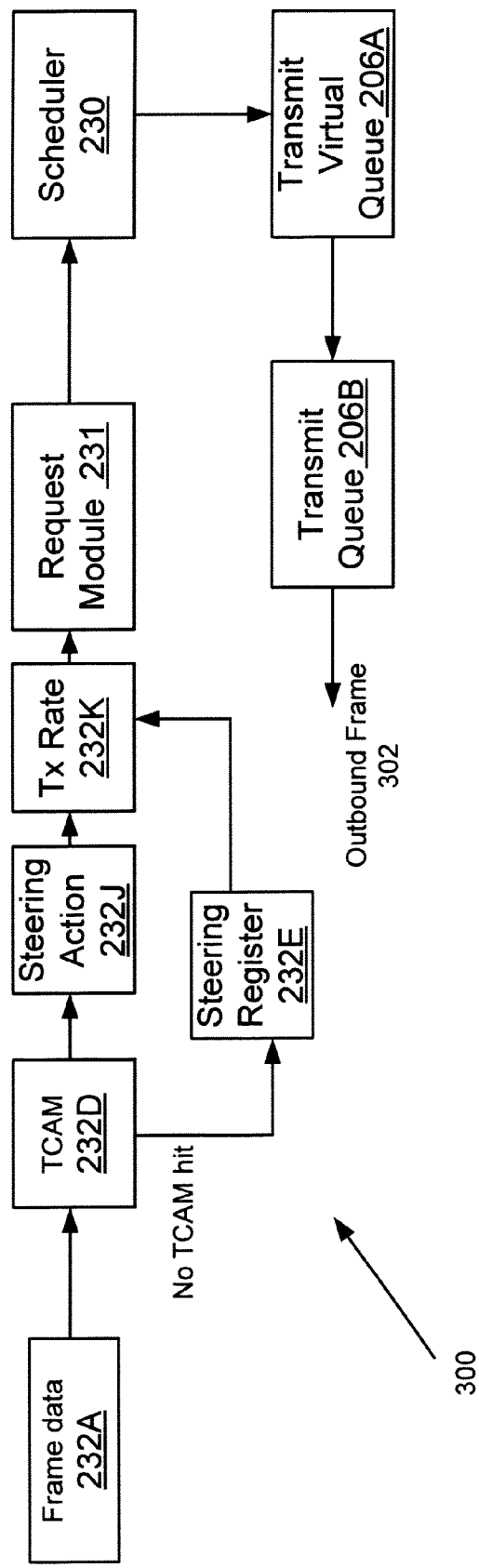
FIG. 3 is a block diagram of a system for routing/steering a frame received at a sub-port of a base-port, according to one embodiment.

FIG. 3 shows a block diagram of a system 300 for routing/steering a frame received at a sub-port of base-port 128, according to one embodiment. System 300 uses the various modules of switch element 120 that have been described above in detail. Frame data 232A for a frame is received by routing sequencer 232. The TCAM 232D is searched, if the frame is not destined for processor 224. If a TCAM match is not found and the frame is a Fibre Channel or FCOE frame, then steering registers 232E are used to obtain the destination information. The transmit memory 232K is checked to determine if the appropriate frame portion has been received to accommodate cut-through routing, if enabled.

The destination information is provided to the request module 231 that generates a request for scheduler 230 to move the frame (or a portion of the frame that is stored and PBUF 204. The frame is provided a virtual transmit queue number 206A. The virtual transmit queue identified by a unique number is maintained at TBUF 206 for storing information to translate or modify a frame by modifier 238. Each transmit virtual queue is associated with a physical transmit queue 206B, also identified by a unique number. One physical transmit queue may be associated with more than one virtual queue (for example, 16 queues). The outbound frames 302 are then moved from the transmit buffer 206 to modifier 238 for further processing before being transmitted via one of the links 250A-250D.

Figure 4:
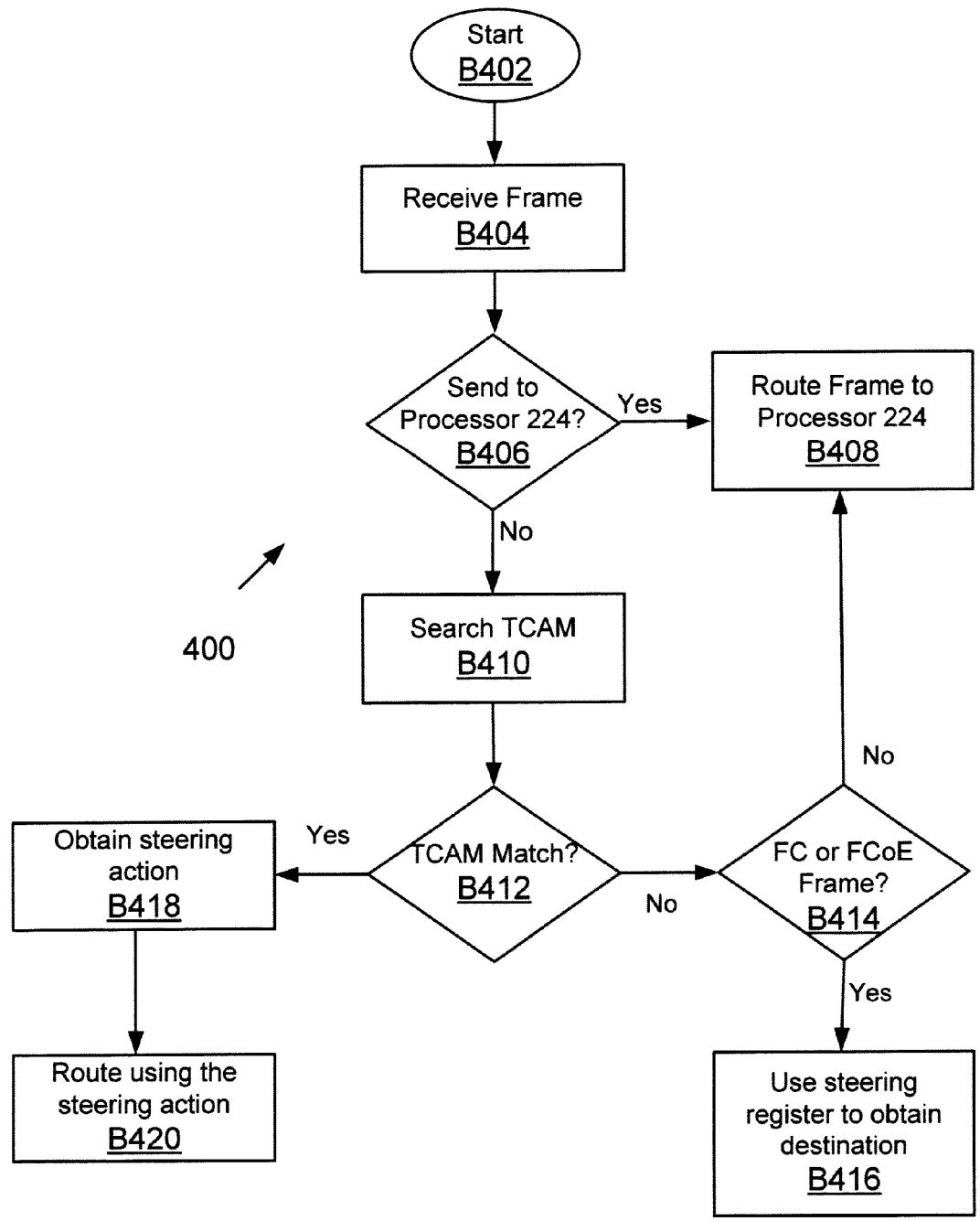
FIG. 4 illustrates an example of a system for routing frames, according to one embodiment.

FIG. 4 shows a process flow 400 for steering frames by sub-port 128, according to one embodiment. The process begins in block B402. A frame is received in block B404. The frame is pre-processed by PCS 212 and MAC 214 during a phase that is allocated to the sub-port that received the frame.

Information regarding the frame is provided to routing sequencer 232 as frame data 232 (FIG. 2C).

In block B406, the routing sequencer determines if the frame is destined for processor 224 i.e. destined for the CPORT 216. If yes, then the frame is routed to processor 224 in block B408.

If the frame is not destined for processor 224, then in block B410, TCAM 232D is searched to determine if there is a match. For example, a TCAM search is conducted using a frame's destination MAC address (DMAC) to determine if the received frame is a multicast frame and to which multicast group the frame belongs. In another example, frame fields are used to search the TCAM for a Denial-of-Service attack.

In block B412, the process determines if there is a TCAM match based on the search in block B410. If there was no match, then in block B414, the process determines if the frame is a Fibre Channel or FCoE frame. If the frame is a Fibre Channel or FCoE frame, then in block B416, the frame's D_ID or AL_PA is used to select a destination from steering register 232E. If the frame is neither Fibre Channel nor FCoE, the frame is forwarded to processor 224.

Referring back to block B412, if there was a TCAM match, then in block B418, a steering action is obtained from steering action memory 232L. A matching row number or entry number is encoded to form an address for accessing the steering action memory 232J. The steering action memory 232J is then read to obtain the steering action. The frame is then routed using the steering action. Examples of steering action codes have been provided above.

Figures 5A, 5B, 5C:
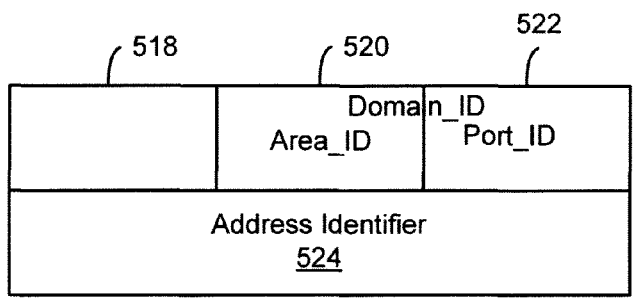
FIGS. 5A-5C illustrate examples of frame formats used by the current embodiments.

FIG. 5A shows an example of an FCoE packet format 500 for processing network and storage traffic, according to the present embodiments. The FCoE packet 500 includes an Ethernet header 502. In one embodiment, the Ethernet header 502, which includes the Ethernet type, may be fourteen bytes in length, for example. The Ethernet header may also include optional Tag fields (not shown). The FCoE packet 500 also includes an FCoE header 504 that includes a number of reserved fields. A start of frame (SOF) 506 indicates the beginning of the embedded Fibre Channel frame and may be one byte, for example.

The FCoE packet 500 may also include a Fibre Channel header (FC Header) 508 that may be 24 bytes long with a payload 510. The Fibre Channel cyclic redundancy code (CRC) 512 may be 4 bytes and the Fibre Channel end of frame (EOF) 514 may be 1 byte in size. The EOF 514 indicates the end of the embedded Fibre Channel frame. The Ethernet FCS 516 is inserted after the Fibre Channel EOF 514.

FIG. 5B shows a standard 24-bit Fibre Channel address identifier 524. The address identifier 524 includes a Domain_ID 518, an Area_ID 520, and a Port_ID 522. The Domain_ID 518 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 520 is an Area identifier based on the middle 8 bits of the 24-bit Fibre Channel address. The Area_ID 520 applies either to (a) one or more N_Ports within and attached to a Fibre Channel switch, or (b) to an Arbitrated Loop of NL_Ports attached to a single FL_Port.

The Port_ID 522 is the lower 8-bits of a Fibre Channel address. The Port_ID 522 applies to either (a) a single N_Port or virtualized N_Port within a Domain/Area, (b) the valid AL_PA of a single NL_Port or FL_Port on an Arbitrated Loop.

FIG. 5C shows an example of the FC header 508 of FIG. 3A. The following frame header fields that are used in the present methods are:

D_ID 508A—A 24-bit Fibre Channel frame header field that contains the destination address for a frame; and S_ID 508B—A 24-bit Fibre Channel frame header field that contains the source address for a frame.

R_CTL 508C—A routing control flag in a Fibre Channel header.

FIG. 6 shows an example of TCAM mapping for different frame types. For example, 600 is TCAM mapping for Fibre Channel frames, 602 is for FCoE frames, and 604 is for Ethernet frames. The embodiments disclosed herein are not limited to any particular frame type.

In one embodiment, the same routing logic (i.e. routing sequencer) is used to determine the destination of frames conforming to multiple protocols. This is efficient because less "real estate" is used in the ASIC for handling multiple protocols.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device, comprising:
a plurality of base-ports, each base-port having a plurality of sub-ports configured to operate independently as a port for sending and receiving information using one of a plurality of network links at a plurality of rates complying with a plurality of protocols; and
a routing module having:
a ternary content addressable memory (TCAM) maintained for storing a plurality of entries for routing frames that are received for the plurality of sub-ports complying with the plurality of protocols; wherein for a sub-port that operates as a Fibre Channel port, the TCAM stores a control field, a destination identifier field, a source identifier field and a start of frame field; and for a sub-port that operates as an Ethernet port, the TCAM stores an Ether type field indicating a frame type, a destination media access control field, source media access control field and a virtual local area network field; and wherein the TCAM provides a frame parameter matching function that is used to determine a steering action from a steering action memory that stores a plurality of steering action codes associated with the plurality of TCAM entries, where depending on a frame protocol type, the steering action codes are for dropping a frame, rejecting a frame and forwarding it to a processor, indicating that a destination port is valid for a frame, indicating that a frame is for a multicast group, indicating to use domain number offset routing for a frame and indicating to use domain and area based routing for a frame; and a steering register that is used for routing a received frame whose information does not match with the TCAM entries and the received frame is a Fibre Channel frame.

2. The network device of claim 1, wherein the network device is a switch coupled to one or more devices.

3. The network device of claim 1, wherein one of the plurality of sub-ports is configured to operate as a Fibre Channel port and the steering register is used to route Fibre Channel frames.

4. The network device of claim 1, wherein one of the plurality of sub-ports is configured to operate as an Ethernet port or a Fibre Channel over Ethernet port (FCoE) and the steering register is used to route the FCoE frames.

5. The network device of claim 1, further comprising a scheduler that is configured to receive requests on behalf of the plurality of sub-ports for moving frames from a receive segment and for transmitting frames from a transmit segment of one of the base-ports.

6. The network device of claim 5, wherein the requests from the plurality of sub-ports are generated by a request module after a destination for received frames is determined by the routing module that maintains the TCAM.

7. The network device of claim 1, wherein the routing module is shared by the plurality of sub-ports.

8. The network device of claim 1, wherein the routing module is dedicated to one of the plurality of sub-ports.

9. A network device, comprising:

a plurality of base-ports, each base-port having a plurality of sub-ports configured to operate independently as a port for sending and receiving information using one of a plurality of network links at a plurality of rates complying with a plurality of protocols;

a scheduler that is configured to receive requests on behalf of the plurality of sub-ports for moving frames from a receive segment and for transmitting frames from a transmit segment of one of the base-ports; and a routing module having a ternary content addressable memory (TCAM) maintained for storing a plurality of entries for routing frames that are received for the plurality of sub-ports complying with the plurality of protocols; wherein for a sub-port that operates as a Fibre Channel port, the TCAM stores a control field, a destination identifier field, a source identifier field and a start of frame field; and for a sub-port that operates as an Ethernet port, the TCAM stores an Ether type field indicating a frame type, a destination media access control field, source media access control field and a virtual local area network field; and wherein the TCAM provides a frame parameter matching function that is used to determine a steering action from a steering action memory that stores a plurality of steering action codes associated with the plurality of TCAM entries, where depending on a frame protocol type, the steering action codes are for dropping a frame, rejecting a frame and forwarding it to a processor, indicating that a destination port is valid for a frame, indicating that a frame is for a multicast group, indicating to use domain number offset routing for a frame and indicating to use domain and area based routing for a frame; and a steering register that is used for routing a received frame whose information does not match with the TCAM entries and the received frame is a Fibre Channel frame;

wherein the requests from the plurality of sub-ports are generated by a request module after a destination for received frames is determined by the routing module that maintains the TCAM.

10. The network device of claim 9, wherein the network device is a switch coupled to one or more devices.

11. The network device of claim 9, wherein one of the plurality of sub-ports is configured to operate as a Fibre Channel port and the steering register is used to route Fibre Channel frames.

12. The network device of claim 9, wherein one of the plurality of sub-ports is configured to operate as an Ethernet port or a Fibre Channel over Ethernet port and the steering register is used to route Fibre Channel over Ethernet frames.

13. The network device of claim 9, wherein the routing module is shared by the plurality of sub-ports.

14. The network device of claim 9, wherein the routing module is dedicated to one of the plurality of sub-ports.

15. A machine-implemented method for routing a frame received by a network device, the method comprising:

maintaining a plurality of entries at a ternary content addressable memory (TCAM) of a routing module for routing the frame for a base-port of the network device having a plurality of sub-ports configured to operate independently as a port for sending and receiving information using one of a plurality of network links at a plurality of rates complying with a plurality of protocols; wherein a sub-port that operates as a Fibre Channel port, the TCAM stores a control field, a destination identifier field, a source identifier field and a start of frame field; and a sub-port that operates as an Ethernet port, the TCAM stores an Ether type field indicating a frame type, a destination media access control field, source media access control field and a virtual local area network field; and wherein the TCAM provides a frame parameter matching function that is used to determine a steering action from a steering action memory that stores a plurality of steering action codes associated with the plurality of TCAM entries, where depending on a frame protocol type, the steering action codes are for dropping a frame, rejecting a frame and forwarding it to a processor, indicating that a destination port is valid for a frame, indicating that a frame is for a multicast group, indicating to use domain number offset routing for a frame and indicating to use domain and area based routing for a frame;

searching the TCAM to determine if information regarding the frame matches any of the TCAM entries;

determining a steering code from the steering action memory at the routing module associated with a matching TCAM entry;

providing a destination information to a request module for routing the frame; and using a steering register of the routing module when there is no matching entry at the TCAM and the frame is a Fibre Channel frame.

16. The method of claim 15, wherein the network device is a switch coupled to one or more devices.

17. The method of claim 15, wherein one of the plurality of sub-ports is configured to operate as a Fibre Channel port and the steering register is used to route Fibre Channel frames.

18. The method of claim 15, wherein one of the plurality of sub-ports is configured to operate as an Ethernet port or a Fibre Channel over Ethernet port and the steering register is used to route Fibre Channel over Ethernet frames.

19. The method of claim 15, wherein the routing module is shared by the plurality of sub-ports or dedicated to one of the plurality of sub-ports.

20. The method of claim 15, wherein a scheduler of the network device is configured to receive requests on behalf of the plurality of sub-ports for moving frames from a receive segment and for transmitting frames from a transmit segment of one of the base-ports.

\* \* \* \* \*